United States Patent [19]

Parham et al.

[11] 4,096,010
[45] Jun. 20, 1978

[54] METHOD AND APPARATUS FOR MANUFACTURING OPTICAL FIBER RIBBONS

[75] Inventors: William Lamar Parham; Morton Jefferson Saunders, both of Atlanta, Ga.

[73] Assignee: Bell Telephone Laboratories, Incorporated, Murray Hill, N.J.

[21] Appl. No.: 766,380

[22] Filed: Feb. 7, 1977

[51] Int. Cl.$^2$ .......................... B32B 5/00; G02B 5/14
[52] U.S. Cl. ..................................... 156/179; 83/102; 156/267; 156/271; 156/436; 156/522; 156/543; 226/198; 242/157 R; 269/21
[58] Field of Search ............... 156/179, 178, 176, 181, 156/180, 515, 249, 304, 344, 584, 502, 157, 158, 436, 324, 303, 441, 558, 267, 271, 259, 285, 517, 543, 522; 350/96 B, 96 UG; 174/117 F; 226/196, 95, 198; 242/15 R, 157.1, 16 R, 16 E, 147 A; 227/119; 28/54; 264/1; 269/21; 214/10.5 R; 254/190 R; 248/363, 362; 65/DIG. 7; 83/102, 107

[56] References Cited

U.S. PATENT DOCUMENTS

| | | | |
|---|---|---|---|
| 2,782,458 | 2/1957 | Emmert et al. | 156/323 |
| 3,113,739 | 12/1963 | Elder | 242/157.1 |
| 3,126,192 | 3/1964 | Stein | 248/362 |
| 3,165,433 | 1/1965 | Markowicz | 156/271 |
| 3,307,761 | 3/1967 | Miller et al. | 226/195 |
| 3,408,031 | 10/1968 | Muir, Jr. | 248/363 |
| 3,481,802 | 12/1969 | Marcell | 156/179 |
| 3,527,636 | 9/1970 | Chartier | 156/173 |
| 3,673,048 | 6/1972 | Gidge et al. | 156/72 |
| 3,880,697 | 4/1975 | Off et al. | 156/517 |
| 3,919,037 | 11/1975 | Miller | 156/502 |
| 3,937,559 | 2/1976 | Ferrentino et al. | 156/179 |
| 3,984,172 | 10/1975 | Miller | 350/96 B |

OTHER PUBLICATIONS

Applied Optics, Apr. 1975, "Optical Fiber Vacuum Check", pp. 816–817.

*Primary Examiner*—David Klein
*Assistant Examiner*—Michael W. Ball
*Attorney, Agent, or Firm*—Charles E. Graves; Harry L. Newman

[57] ABSTRACT

A method and apparatus for manufacturing optical fiber ribbons featuring an optical fiber payout arrangement for directing a plurality of optical fibers into parallel paths in a predetermined plane of travel; a vacuum assisted fiber guide for accurately positioning the fibers into a precise, coplanar parallel array; means for bringing together the arrayed fibers and a ribbon-like supporting medium to form an optical fiber ribbon with outer segments of the supporting medium extending beyond the outermost fibers; cutting means for separating the outer segments of the supporting medium for the optical fiber ribbon; and means for advancing the outer segments to thereby advance both the ribbon-like supporting medium and optical fibers in unison through the manufacturing apparatus.

14 Claims, 12 Drawing Figures

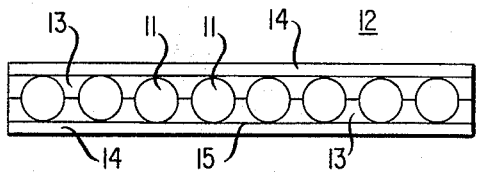
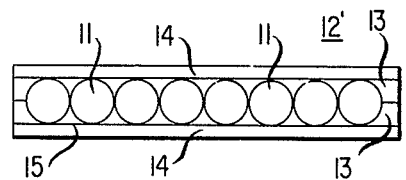
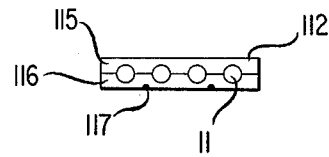
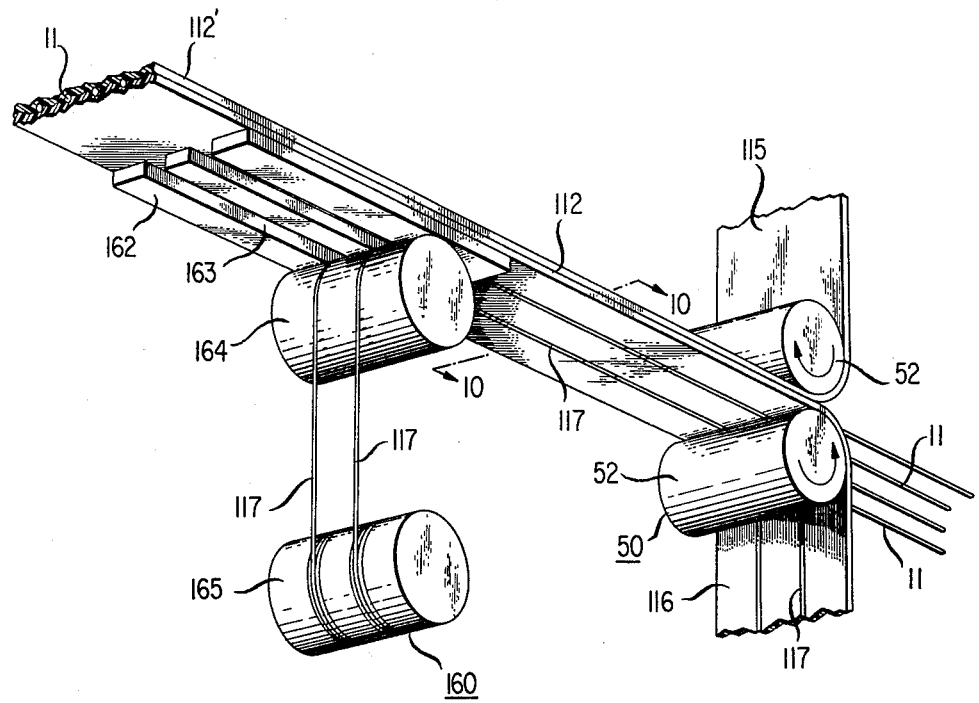

METHOD AND APPARATUS FOR MANUFACTURING OPTICAL FIBER RIBBONS

BACKGROUND OF THE INVENTION

This invention relates to light-transmitting optical fibers and more particularly to a method and apparatus for manufacturing optical fiber ribbons.

There is substantial interest in using light-transmitting optical fibers in future optical communications systems. Their large channel capacity and small diameter make them very attractive alternatives to conventional wire and metallic waveguides.

However, some mechanical and physical characteristics of optical fibers are less desirable and hinder their full development as a feasible light-transmitting medium. Optical fibers tend to be brittle and break at small ultimate elongations which causes total transmission loss. Also, surface abrasion reduces the tensile strength of fibers and increases the chance of fiber fracture. Furthermore, optical fibers are susceptible to optical losses due to various introduced stresses even if the forces are not sufficient to fracture the fibers. Unfortunately, optical fibers in any practical implementation will be subjected to various stresses and deformations during manufacture, packaging, field installation, and service.

While the small size of optical fibers is desirable in terms of space efficiency in replacing wire cables, this small size also renders optical fibers very fragile and difficult to handle individually without mechanical damage. Also, this small size makes fibers difficult to splice; mating fibers must axially align with each other if splicing with low optical losses is to result.

One approach to solving the above difficulties with optical fibers has been to put them in more manageable units such as arranging the fibers in linear arrays and packaging them in some supporting medium to form optical fiber ribbon structures. The fibers are then easier to handle and better protected mechanically as well.

However, ribbon structures can also add optical losses to the light-transmitting optical fibers being packaged. During the manufacture of ribbon structures especially, mechanical damage to the fibers such as abrasion can occur. Also, the ribbon manufacturing process can introduce residual stresses, such as by tensilely loading the optical fibers being packaged.

While ribbon structures can also facilitate splicing of groups of fibers which are more convenient and quicker to connect than individual mating pairs, fibers often are not sufficiently aligned along the ribbon structure to permit gang splicing with low losses. Hence, it is desirable to develop a means for accurately aligning fibers along the entire length of the ribbon being manufactured. Alternatively, an easy approach of locating the fibers in preparation for gang splicing is desired.

Accordingly, it is one objective of this invention to develop a method and apparatus for manufacturing optical fiber ribbons with minimum optical loss to the fibers.

A second objective is to minimize external forces on the fibers during ribbon manufacture.

A third objective is to accurately align the light-transmitting optical fibers in ribbon structures that facilitate gang splicing.

A fourth objective is to develop a simple and convenient method of locating optical fibers into a precise, predetermined array.

SUMMARY OF THE INVENTION

Pursuant to the foregoing objectives and others, the present invention teaches a method and apparatus for manufacturing optical fiber ribbons which subject the fibers being packaged to a minimum of stress and abrasion and accurately aligns them as well.

One aspect of this invention is a novel optical fiber payout arrangement which requires a minimum of space and directs the plurality of optical fibers into substantially parallel paths prior to their entry and precise alignment in a fiber-aligning guide. In the payout arrangement, optical fiber supply reels pivot along axes parallel to the preselected axis of travel for the optical fiber ribbon being made. A first set of idler sheaves, pivoted about axes parallel to the axis of travel, and a second set of idler sheaves, pivoted about axes normal to the axis of travel, cooperate to direct the fibers from the supply reels into the desired parallel paths and to the fiber aligning guide with a minimum of abrasion and stress to the fibers. The second set of sheaves are advantageously arranged in a V-shaped configuration to prevent crossing or touching of the fibers as they enter into their respective parallel paths.

Another aspect of this invention is a novel fiber aligning guide which includes a fiber-aligning substrate surface with vacuum slots to vacuum-attract the plurality of optical fibers to the surface. The vacuum-attraction, in combination with a spring-mounted covering means, assures precise fiber alignment and yet accommodates for dimensional variations in the fibers passing through the fiber aligning guide, hence, preventing fiber abrasion or breaks otherwise possible with oddsized fibers.

Another aspect of this invention is that the fibers can easily be loaded into a precise array in the fiber aligning guide. The fibers are sequentially located on the vacuum-attracting substrate surface of the guide with a vacuum-blocking device which one uses to selectively expose vacuum-attracting portions of the substrate. The vacuum-attraction holds the located fibers in place as subsequent fibers are being located.

A further aspect of this invention is the method by which the manufactured optical ribbon and component parts, i.e., the optical fibers and the ribbon-like supporting medium, are advanced through the ribbon manufacturing apparatus. In the illustrative embodiment, the manufactured ribbon includes extraneous segments extending at either side of the supporting medium beyond the width desired for the finished optical fiber ribbon. The extraneous segments, which are severed from the ribbon after the fibers are secured to the supporting medium, are then advanced through the manufacturing apparatus with motor-driven rollers. Advancing the segments causes advancement of the optical fibers and supporting medium. The advancing technique advantageously minimizes tensile loading of the fibers during ribbon manufacture and prevents residual stresses from otherwise being introduced to the optical fiber ribbon as the fibers are being secured to the supporting medium.

The invention will be readily understood by the following description of certain embodiments by way of example in conjunction with the drawings.

BRIEF DESCRIPTION OF THE DRAWING

FIG. 1A illustrates the FIG. 1 apparatus in side view;

FIGS. 8A and 8B depict in cross-section two optical fiber ribbon structures made with the inventive optical fiber ribbon manufacturing apparatus;

FIG. 9 shows in perspective view an alternative ribbon advancing mechanism; and

FIG. 10 depicts in cross-section along line 10—10 the ribbon structure illustrated in FIG. 9.

DETAILED DESCRIPTION

Figure 1:
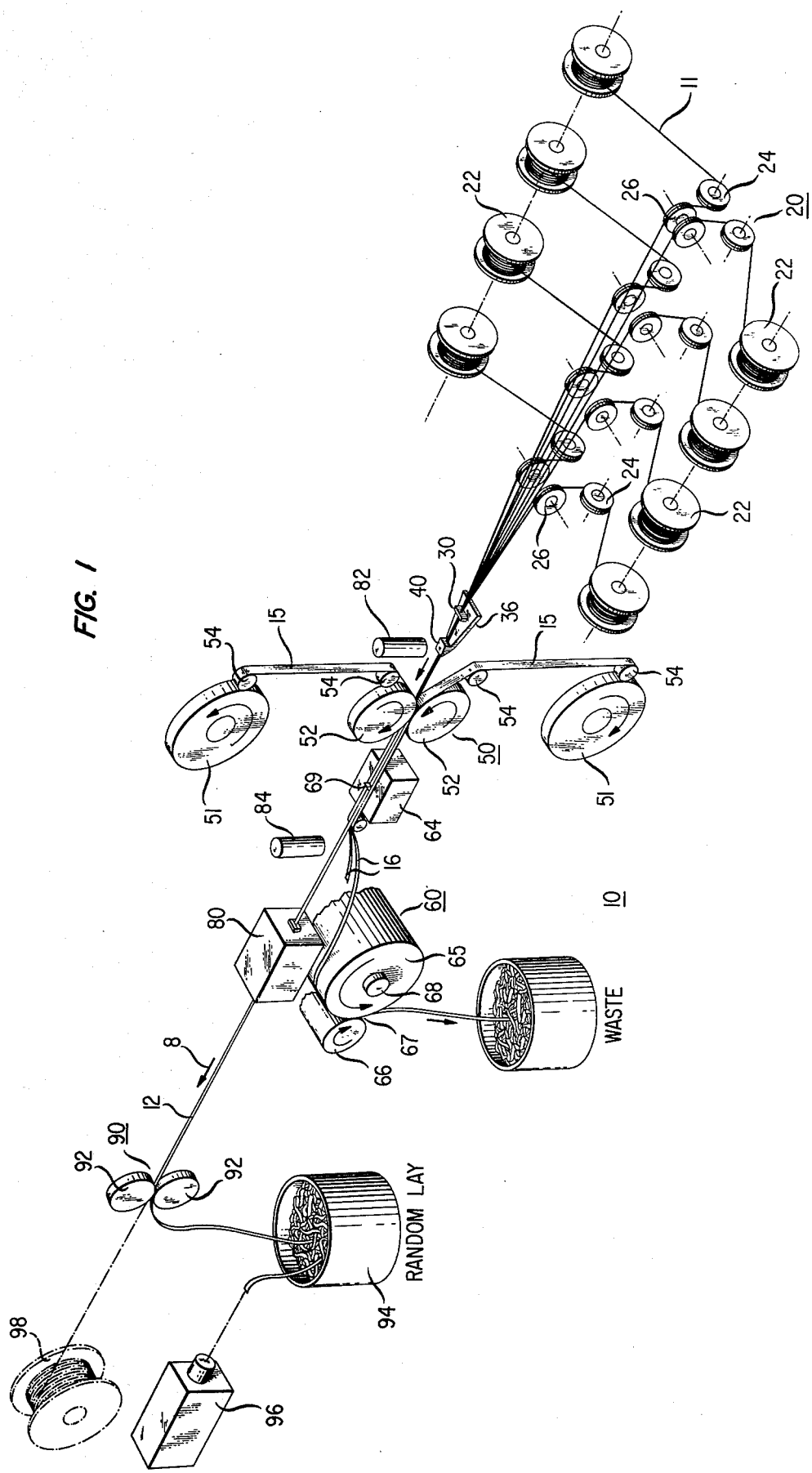
FIG. 1 illustrates schematically in perspective one illustrative embodiment of the optical fiber ribbon manufacturing apparatus.

Illustrated schematically in FIG. 1 is one embodiment 10 of an optical fiber ribbon manufacturing apparatus which manufactures optical ribbons in accordance with this invention. The ribbon manufacturing apparatus 10 comprises an optical fiber payout arrangement 20, a fiber organizer 30, a vacuum-assisted fiber-aligning guide 40, a ribbon packaging mechanism 50, a ribbon advancing mechanism 60, and ribbon take-up arrangement 90. The advancing mechanism 60, which will be described in further detail below, draws the manufactured ribbon 12 and the ribbon components through the manufacturing line 10.

The FIG. 1 apparatus is illustrated in side view in FIG. 1A. In accordance with this invention, the apparatus components are all aligned to cause the optical fibers 11 and optical fiber ribbon 12 to travel in a predetermined plane of travel denoted P. This plane of travel P, which substantially coincides with the major plane of the manufactured ribbon 12 and includes the axis of travel for the ribbon as denoted by arrow 8, is a horizontal plane which is seen in FIG. 1A as line P—P.

Figure 2:
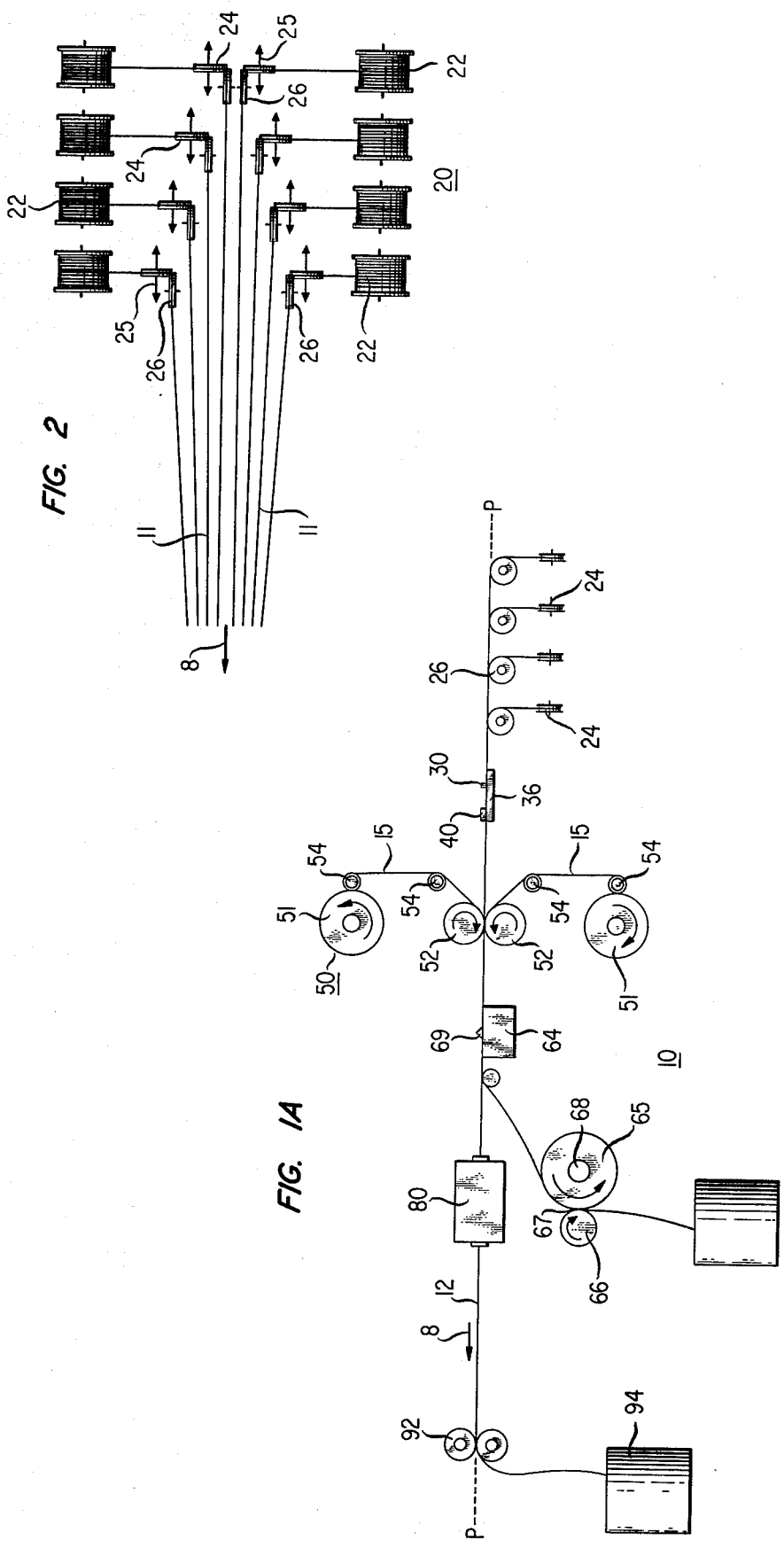
FIG. 2 illustrates the FIG. 1 fiber payout arrangement in plan view.

As illustrated in FIGS. 1, 1A, and 2, the payout arrangement 20 directs a plurality of optical fibers 11 into the predetermined plane of travel P. At the same time, the payout arrangement 20 also directs the optical fibers 11 into substantially parallel paths which are substantially parallel and adjacent to the ribbon axis of travel 8. The payout arrangement minimizes the abrading of fibers, not only at the payout but also at the fibers' entry into fiber guide 40. As the fibers are preliminarily directed into parallel paths in the predetermined plane of travel, the amount of bending stress and abrasion of the fibers at the entrance of guide 40 are reduced to a minimum.

In the optical fiber payout arrangement 20, a plurality of optical fiber supply reels 22 are advantageously positioned to rotate about axes substantially parallel to the ribbon axis of travel 8. A plurality of first idler sheaves 24, one corresponding to each reel 22, receive the fibers 11 from the reels 22. Preferably, the first idler sheaves 24 rotate on axes substantially parallel to the ribbon axis of travel 8 and are grooved along their circumferences to engage the fibers 11 from reels 22.

A plurality of second idler sheaves 26, also grooved along their circumferences, are substantially adjacent to the corresponding first idler sheaves 24, from which corresponding fibers 11 are fed. The second idler sheaves 26 rotate on axes substantially normal to the ribbon axis of travel 8 to direct the fibers 11 into the parallel paths in the predetermined plane of travel as illustrated in FIG. 2. Advantageously, the fibers 11 do not cross or touch in their paths due to the V-shaped arrangement of the second idler sheaves 26 with respect to the ribbon axis of travel 8. The second idler sheaves 26 furthest from the fiber guide 40 feed the centermost fibers 11 of the ribbon 12 to the guide 40.

Each corresponding pair of first and second idler sheaves, 24 and 26 respectively, are coupled so that the path travelled by the corresponding fiber 11 between the two sheaves is substantially normal to the rotational axes of both sheaves to minimize abrasion of fiber 11 by the sheaves. The idler sheaves 24 and 26 have diameters substantially larger than the diameters of the fiber such that optical losses and breakage due to bending are minimized.

In the Fig. 2 fiber payout arrangement, the optical fibers 11 are helically wrapped about the reels 22 so that the fibers 11 pay out to the sheaves 24 from different points along the rotational axes of the reels 22. The first idler sheaves 24 are hence mounted on bearings, such as known conventionally in the art, which permit the sheaves 24 to translate, as indicated by arrows 25, in response to the fibers 11 feeding from the reels 22 so that the fibers 11 can follow their most natural paths into sheaves 24. This advantageously ensures that fibers 11 are not substantially skewed as they make contact with idler sheaves 24.

Figure 3:
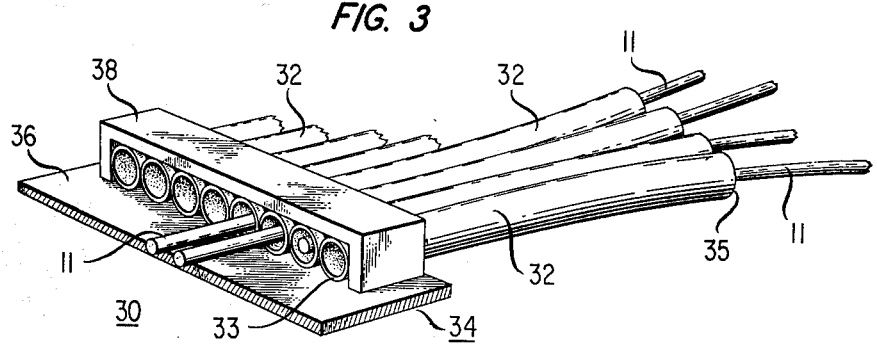
FIG. 3 shows perspectively the fiber organizer illustrated in FIG. 1 in detail.

As an alternative to the above payout arrangement 20, or as an additional fiber directing device to control the fibers 11 entering fiber guide 40 is fiber organizer 30 shown in FIGS. 1 and 3. Organizer 30 comprises a plurality of flexible tubes 32, made of a material such as low density polyethylene, and hence bendable at very low stresses. The tubes 32 have interior circumferences substantially larger than the fibers 11 to permit easy fiber insertion and to minimize surface abrasion between the tubes 32 and the corresponding fibers 11. The tubes 32 have first ends 35 for receiving the fibers 11 from the payout arrangement 20 or reels 22. The second ends 33 of the tubes 32, the ends directing the fibers 11 to fiber guide 40, are held tightly in place with a holder 34, which in FIG. 3 is illustrated by a platform 36 on which it is mounted an inverted U-shaped cover 38. The tubes at ends 33 are held in the predetermined plane of travel in fixed parallel relation with one another. The first ends 35 of the tubes 32 are left free to flex and bend in response to the movement of the fibers 11 being fed from the payout which is shown exaggerated in FIG. 3. As the fibers 11 travel from the first ends 35 to the second ends 33, they are gradually urged into a coplanar and parallel arrangement. Advantageously, the tubes 32 are sufficiently long in their length so that entry of corresponding fibers 11 at any forseeable angle will not cause abrupt deformations of the tubes 32 and hence not cause any abrasion or shock loads to the fibers 11.

Figure 4:
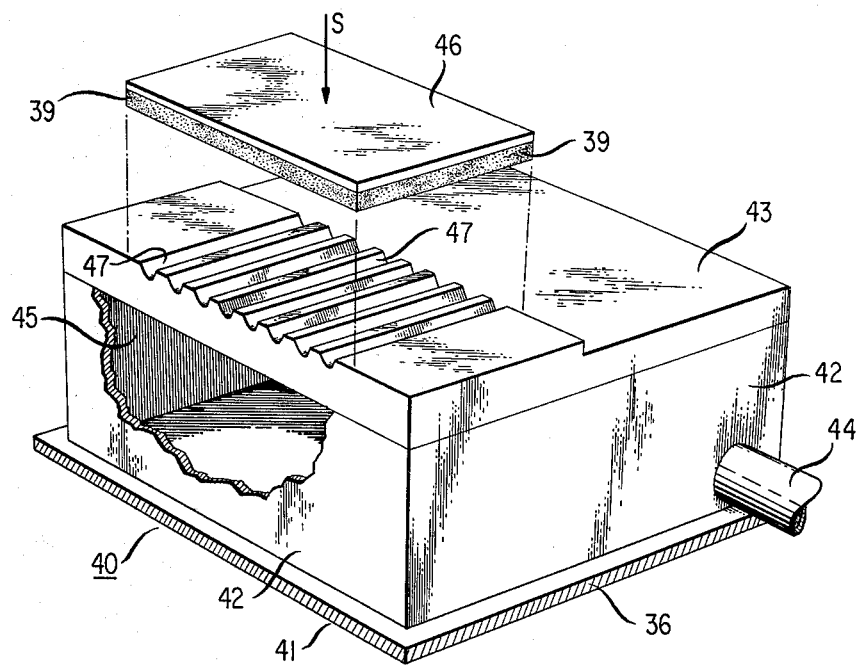
FIG. 4 illustrates perspectively and in partial cutaway one embodiment of a vacuum-assisted fiber guide having a grooved fiber-receiving surface plate.

Shown in FIG. 4 is an illustrative embodiment of the vacuum-assisted fiber-aligning guide 40 which accurately locates and holds fibers 11 in a precisely spaced coplanar array during ribbon manufacture. Fiber guide 40 comprises a vacuum housing base 41 formed from a plurality of housing walls 42 mounted air tightly to platform 36, a surface plate 43 mounted air tightly onto the housing base 41, an exhaust line 44 for withdrawing a controlled amount of air from a vacuum chamber 45 created by housing base 41 and surface plate 43, and a spring-mounted cover 46. The vacuum pump connecting to the exhaust line 44 is not shown.

Figure 5:
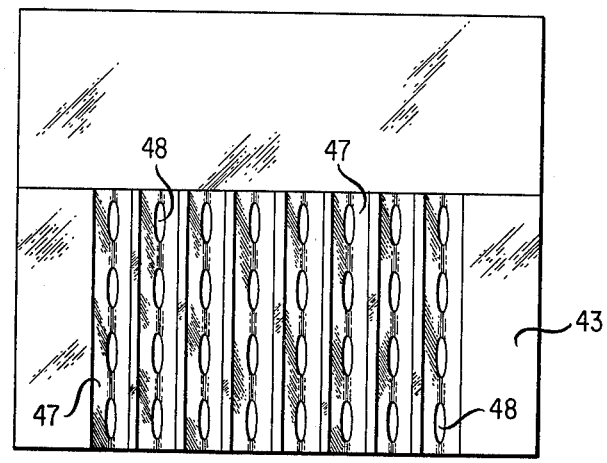
FIG. 5 shows in top view the grooved fiber-receiving surface in FIG. 4.

Surface plate 43, which is also illustrated in FIG. 5, comprises a plurality of parallel optical fiber receiving grooves 47 having the predetermined center-to-center spacing desired for the fibers 11. A plurality of vacuum slots 48 which are located in the bottom of the grooves 47, lead to vacuum chamber 45 and supply air suction to draw and hold the fibers 11 to the grooves 47 when the vacuum pump is operating.

Figure 6:
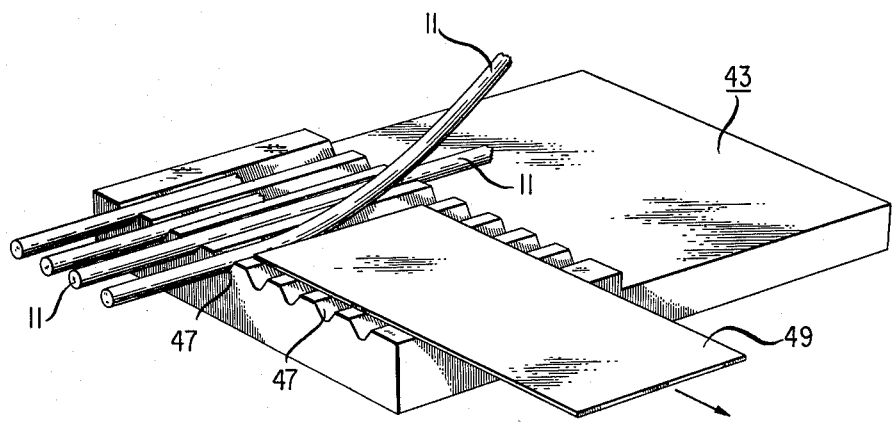
FIG. 6 depicts a plurality of optical fibers being sequentially loaded in the FIG. 4 guide.

In accordance with this invention, the vacuum-assisted fiber-aligning guide 40 facilitates easy and precise loading of the optical fibers 11 into guide 40 in preparation for ribbon manufacture as depicted in FIG. 6. The fibers 11 are manually located into respective grooves 47 sequentially and held in their grooves with air suction supplied through the vacuum slots 48. In the loading operation, a vacuum-blocking device 49, such as a piece of paper, is placed over all the grooves 47 except for one groove 47 where a fiber 11 is to be placed. As a fiber 11 is placed near the uncovered or exposed groove 47, air suction through the vacuum slots 48 in the groove 47 attracts the fiber 11 to the uncovered groove 47 and holds the fiber in place.

Preferably, the groove 47 at one end of the array is chosen as the initial exposed groove; otherwise, a second vacuum-blocking device will be needed to cover grooves on the other side of the exposed groove.

The vacuum slots 48 insure that the located fiber does not dislodge while the other fibers 11 are being located. Also, because the located fiber 11 covers the slot or slots 48 of the corresponding groove 47, the groove no longer attracts the other fibers 11.

After the first fiber 11 has been located, the vacuum-blocking device 49 is moved to expose another groove 47, preferably one adjacent to the previously exposed groove, and another fiber 11 is located on the surface plate. This is continued until all the fibers 11 have been so located in the grooves.

This simple and convenient loading technique, which requires a minimum of apparatus, accurately aligns fibers 11 in a precise array with a predetermined fiber-to-fiber spacing. Advantageously, fiber guide 40 and the inventive loading technique eliminate the need to thread fibers through fixed guide channels known in the art which sacrifice fiber alignment for ease of fiber insertion and travels through the channel.

After the fibers 11 have been located in their respective grooves 11 with the above loading technique, the spring-mounted cover 46, comprising a felt pad 39 for cushioning the fibers 11, is placed over the arrayed fibers 11 to hold them in alignment during ribbon manufacture.

In accordance with this invention, the fiber guide 40 advantageously accommodates for cross-sectional variations in the fibers 11 during ribbon manufacture. In the illustrative embodiment, the cover 46 is spring-mounted to apply a controlled downward force S, as illustrated in FIG. 4, which urges the fibers 11 against their respective grooves 47 and yet permits transverse displacements of the fibers 11 passing through guide 40 due to variations in fiber shape and size. Also, in the illustrative embodiment, the vacuum pump is left on during ribbon manufacture. Air suction through the vacuum slots 48 supplements the spring-mounted cover 46 by continuously vacuum-attracting the fibers 11 to their respective grooves 47. This flexible hold on the fibers 11 reduces chances of surface abrasion or breakage of the fibers by guide 40 as the fibers are drawn along by advancing means 60.

The loading technique described above and depicted in FIG. 6 is not limited to ribbon manufacture but can be used to easily align fibers for gang splicing, especially where the desired spacing of the fibers to be spliced differs from that of the ribbon structure or where the fibers have not yet been arranged at all. In either case, it may be desirable to use fiber organizer 30 in conjunction with fiber guide 40; organizer 30 would then operate to preliminarily position the fibers prior to their placement in guide 40.

While it is desirable in most gang splicing techniques to space the fibers apart at some distance greater than their diameters so that the fibers are not touching, packaging optical fibers in contiguous coplanar arrays as shown in FIG. 8B conserves space, and hence, is sometimes a more desirable configuration in an optical cable design. Also, this configuration provides additional mechanical protection of the fibers in that the fibers support one another. It is apparent that fibers manufactured in a conttiguous array can easily be rearranged using the locating technique and apparatus depicted in FIG. 6 when respacing the fibers for splicing is desired.

Figure 7:
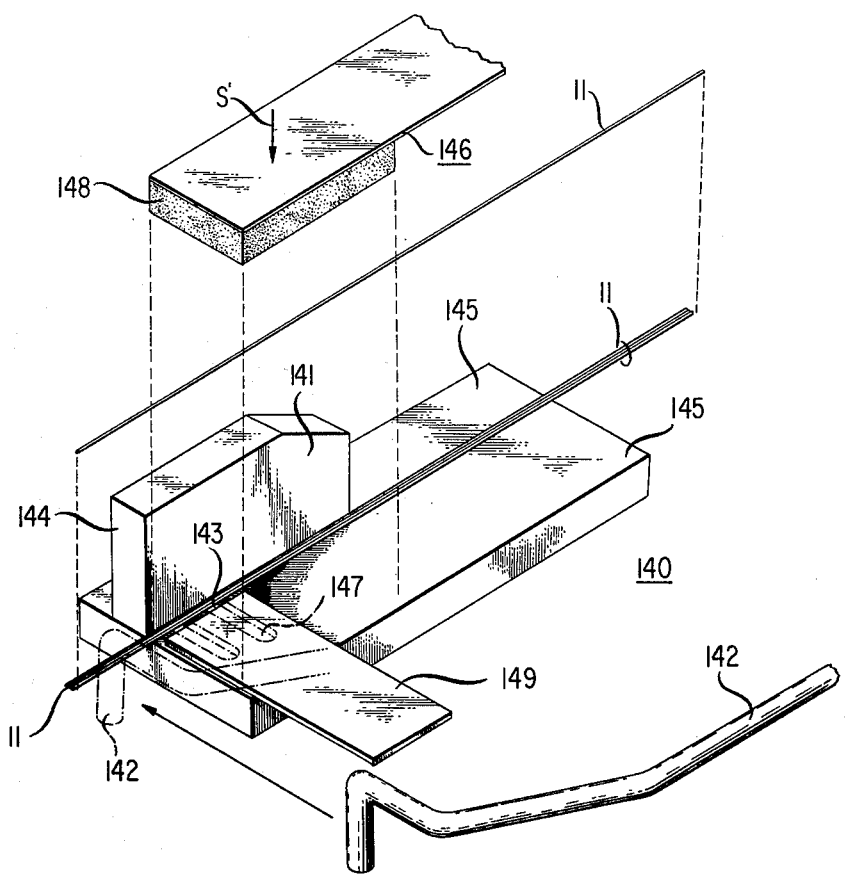
FIG. 7 illustrates in perspective a second embodiment of the vacuum-assisted fiber guide without the vacuum housing base and depicts the operation of sequentially arranging a plurality of fibers in the guide.

FIG. 7 illustrates a second embodiment denoted 140 of the vacuum-assisted fiber-aligning guide (for convenience, shown without the vacuum housing) which is used advantageously to locate and align a contiguous coplanar array of optical fibers 11. A block 144, which mounts onto planar surface plate 145, forms a reference planar surface 141 substantially parallel to the desired longitudinal axes of fibers 11. Two vacuum slots 147, to which a controlled degree of vacuum is applied, extend substantially from reference surface 141 in a direction substantially normal to reference surface 141 and are as long as needed to vacuum-attract and draw all the fibers 11 into a coplanar array to surface plate 145 during fiber loading. It is readily apparent that one slot 147 may be sufficient.

To load the fibers onto surface plate 145, a vacuum-blocking device 149 is used to cover the vacuum slots 147 but for a portion of each of the slots being used to vacuum-attract and hold a fiber being placed on surface plate 145. After placement, a first fiber 11 is then urged against reference surface 141 with an edge 143 of the vacuum-blocking device 149. The edge 143 is preferably linear to assure parallel abutment of fiber 11 against reference surface 141.

Vacuum-blocking device 149 is then moved to expose another portion of the slots 147, preferably near the previously placed fiber 11, to locate a second fiber 11. Edge 143 is again used, this time to urge the second fiber 11 ino parallel alignment and abutment with the previously located fiber. This operation continues until all the fibers are arranged into a contiguous coplanar array on surface plate 145.

After the fibers have been located, a cover 146, with a cushioning layer 148, is then placed over the fibers. Cover 146 is advantageously spring-loaded to apply controlled downward force S' against the aligned fibers 11. In addition, a spring 142 having a predetermmined force is placed against the furthermost fiber 11 from the reference surface 141 to gently urge the fibers 11 toward block 144. The forces of the cover 146 and spring 142 maintain a flexible hold on the fibers 11 during ribbon manufacture. Also, the vacuum pump may be left on during ribbon manufacture to advantageously supply suction force, which will continuously urge the fibers 11 back into parallel alignment against surface plate 145.

Depicted in cross-section in FIGS. 8A and 8B are two illustrative ribbon structures made with ribbon manufacturing apparatus 10 having guides 40 and 140 respectively. Both ribbon structures 12 and 12' comprise a plurality of optical fibers 11 which are packaged in a parallel coplanar array and embedded between two layers 13 of pressure-sensitive adhesive, such as silicone or acrylic adhesive, which are coated on tapes 14 made of polyethylene terphthalate. The viscosity of the adhesive layers advantageously provides sufficient loose packaging of the fibers to permit stress relief, and hence to minimize microbending loss.

In addition, in the illustrated ribbon structures, the optical fibers 11 are advantaeously coated with a thick polymer layer, such as disclosed in U.S. Pat. application, Ser. No. 639,912, filed Dec. 11, 1975, and assigned to the assignee hereof. The coating, which reduces microbending loss and affords abrasion protection, is applied to the fibers before they are wound onto the optical fiber supply reels 22 in the illustrated apparatus 10.

These particular ribbon structures are easy to separate for splicing purposes. The adhesive backed tapes can easily be pulled apart after they are nicked.

The ribbon packaging mechanism 50 illustrated in FIG. 1 comprises two payout reels 51 for feeding the adhesive backed tapes 15 to two pressure rollers 52 with the adhesive layers 13 facing each other. The arrayed fibers 11 from fiber guide 40 feed into pressure rollers 52 between the tapes 15. The pressure rollers 52 cause adhesion of the adhesive layers 13 to the fibers and cohesion between the two adhesive layers 13 which, in turn, simultaneously embeds the fibers 11. Guiding rollers 54 direct the tapes 15 from the reels 51 to pressure rollers 52.

It is apparent that other techniques of packaging the fibers can be used in conjunction with applicants' inventive apparatus 10, and would depend on the resulting optical fiber ribbon structure desired and the supporting medium involved.

However, whether the packaging mechanism involves only pressure rollers to produce a ribbon or thermal heat in conjunction with rollers such as used in several other known ribbon structures, the ribbon-like supporting medium, such as the tape 15, in the illustrated embodiment, is wider than that desired for the ultimate or finished ribbon structure to permit removal of extraneous segments 16 of the ribbon-like supporting medium extending from the outermost fibers of the ribbon structure.

Shown in FIG. 1 is a ribbon cutter 64, which comprises two blade cutters 69 set apart at somme predetermined spacing; the cutter 64 separates and severs the outer segments 16 of the supporting medium from ribbon 12 after ribbon 12 emerges from pressure rollers 52.

In accordance with this invention, the two outer segments 16 from the outer edges of ribbon 12 then feed to the advancing mechanism 60, which comprises motor-driven rotating rollers, 65 and 66. The rollers, which extend from one side of the ribbon axis of travel 8 to the other, rotate about axes substantially normal to the ribbon axis of travel. FIG. 1 illustrates only part of the rollers.

The rollers, 65 and 66, are in substantial touching contact with each other at a line 67 along their outer edges where the corresponding segments 16 are to be gripped and pulled through by frictional action. By drawing the outer segments 16 through the manufacturing line 10, the rotating rollers also supply the power to pull the manufactured optical ribbon 12 and ribbon components through the manufacturing line 10 and ribbon cutter 64. It is apparent that the extraneous segments 16 are of sufficient tensile strength by themselves to advance the manufactured ribbon through the manufacturing line 10. Because the advancing mechanism pulls only the outer ribbon segments 16, the amount of tensile load applied to the fibers 11 as they are being packaged into ribbons 12 is minimized, hence reducing introduction of residual stress into the fibers.

An encoder 68 monitors the length of outer tape segments being pulled through the rotating rollers 65 and 66.

It is appreciated in the broadest sense of applicants' invention that other portions of the ribbon-like supporting medium can be dissociated from the ribbon structure to pull the ribbon and its components through the manufacturing line. For example, shown in FIG. 9 is an alternative ribbon structure 112 being advanced through the packaging mechanism 50 with an alternative advancing mechanism 160.

Ribbon 112, which is shown in cross-section in FIG. 10 in a view taken along line 10—10 in FIG. 9, comprises two elongate plastic tapes 115 and 116 between which are embedded a plurality of optical fibers 11. Two longitudinal strength members 117, such as metallic wire, are dissociably embedded along one surface of the tape 116.

The longitudinal strength members 117, which are extraneous to the ultimate ribbon structure 112' and have sufficient tensil strength by themselves to advance the ribbon through the manufacturing apparatus, are used to advance the ribbon 112 as depicted in FIG. 9. FIG. 9 shows the strength members 117 being dissociated from ribbon 112 and taken up by motor-driven roller 165. The dissociating means in this advancing mechanism comprises a roller 164 and a ribbon support plate 162 with slots 163. The slots 163 permit downward movement of the strength members 117 to the take-up roller 165 while the ribbon support plate 162 holds the ribbon structure 112' in the predetermined plane of travel P. Roller 164 aids to cause gradual dissociation of strength members 117 from ribbon 112'.

Shown in FIG. 1, the ribbon take-up arrangement 90 cooperates with ribbon advancing mechanism 60 to permit zero or substantially zero tension take-up of ribbon 12. In the illustrated embodiment, a set of ribbon take-up capstans 92 draw the ribbon 12 away from cutter 64 after which the ribbons are randomly placed in a ribbon receptacle 94. The speed of capstans 92 is controlled by encoder 68 to advance the ribbon 12 at a rate substantially equal to that of the outer segment take-up. This essentially zero tension take-up of the ribbon 12 permits loss measurements to be taken of the fibers as schematically depicted by laser 96. The detectors at the other end of the fibers 11 in the reels 22 are not shown.

Alternatively, ribbon take-up reel 98 can be used to draw and take up the manufactured optical ribbon 12 under a predetermined controlled tension using a conventional clutch (not shown). Preferably, the ribbon tension is considerably less than that applied on the outer segments 16 by the advancing mechanism 60.

Also illustrated in FIG. 1 is a station 80 for dusting the manufactured ribbon 12. A material, such as calcium stearate, is applied to ribbon 12 to reduce the tackiness of the exposed adhesive layers 13 along the outer edges of ribbon 12.

Further shown in FIG. 1 are two microscopes 82 and 84 which are advantageously used to permit visual observation of the fibers being positioned in the fiber guide 40 and of the finished optical fiber ribbon 12 exiting from the cutter 64, respectively.

It is understood that the embodiments described herein are merely illustrative of the principles of the invention. Various modifications may be made without departing from the spirit and scope of the invention.

What is claimed is:

1. A method for manufacturing an optical fiber ribbon structure comprising a plurality of precisely arranged coplanar and parallel optical fibers secured to a ribbon-like supporting medium, comprising:
   directing with at least a fiber-aligning guide said plurality of optical fibers from supply reels into parallel paths in a predetermined plane of travel;
   bringing together said optical fibers and said supporting medium to produce an optical ribbon structure with extraneous outer segments extending beyond the outermost fibers at either side of said ribbon;
   severing said cutter segments from said optical ribbons; and
   advancing said severed outer segments to simultaneously advance said ribbon structure, said optical fibers and said supporting medium.

2. The method pursuant to claim 1 wherein said directing step further comprises:
   continuously attracting said aligned fibers to at least one reference surface in said fiber-aligning guide with air suction being supplied through vacuum slots on said reference surface; and
   continuously urging said fibers with a controlled force against said reference surface in said guide with a spring-loaded cover.

3. The method pursuant to claim 1 wherein said fiber-aligning guide comprises a surface comprising a plurality of parallel and coplanar fiber-receiving grooves with at least one vacuum slot in each groove through which a controlled amount of air is sucked to attract and hold a corresponding fiber, said method further comprising:
   loading said fibers into said respective grooves.

4. The method pursuant to claim 3 wherein said loading step comprises:
   covering all said grooves but a first groove;
   placing a first fiber substantially into said first exposed groove whereby air suction aids to attract said fiber into said groove and to hold said fiber in said groove;
   exposing a next groove;
   placing a next fiber into said corresponding next groove; and
   continuing said two preceding steps until all said fibers have been located into their respective grooves.

5. The method pursuant to claim 1 wherein said fiber-aligning guide comprises a planar substrate surface with at least one vacuum slot for vacuum-attracting said fibers to said surface, said method further comprising:
   loading said fibers onto said surface.

6. The method pursuant to claim 5 wherein said vacuum-attracting surface is planar and said loading step locates said optical fibers into a contiguous coplanar array, said loading step further comprises:
   covering said vacuum slot but for a first portion left exposed;
   placing a first fiber onto said surface over said exposed portion of said slot, whereby said air suction through said exposed portion attracts and holds said fiber to said surface;
   exposing a next portion of said vacuum slot substantially adjacent said just placed fiber;
   placing a next fiber down onto said surface over said next slot portion;
   moving said next fiber until said next fiber axially abuts said adjacent placed fiber; and
   continuing said three preceding steps until all said fibers have been located.

7. Apparatus for manufacturing an optical fiber ribbon comprising a plurality of parallel optical fibers secured to a ribbon-like supporting medium, wherein said optical fiber ribbon includes segments of said ribbon-like supporting medium extending beyond the outermost fibers, said apparatus comprising:
   means including a fiber-aligning guide for directing said fibers into predetermined parallel paths of travel;
   means for bringing together said medium and said fibers to manufacture said ribbon;
   means for stripping said outer segments from said ribbons; and
   means for advancing said stripped outer segments so as to advance said ribbon, the remaining medium and said fibers in unison.

8. Apparatus pursuant to claim 7 wherein said fiber-aligning guide comprises a fiber-aligning substrate surface with at least one vacuum slot for vacuum-attracting said fibers to said surface and a spring-loaded cover for continuously urging said fibers against said surface.

9. Apparatus pursuant to claim 2 wherein said directing means also comprises:
   a source for said plurality of optical fibers;
   a fiber organizer comprising:
      a plurality of flexible tubes with interior cross sections substantially larger than the diameters of said fibers, said tubes having first ends for receiving said fibers from said source and second ends for directing said fibers to said fiber guide; and
      a holder for maintaining said second ends of said tubes in fixed parallel relation with one another in said predetermined plane of travel.

10. Apparatus pursuant to claim 2 wherein said medium comprises two film strips, each having a pressure-sensitive adhesive layer on one side, said bringing together means further comprising:
    a pair of reels for supplying said film strips; and
    a pair of pressure rollers for causing adhesion of said film strips, said rollers receiving said film strips from said supply reels with said adhesive layers facing each other and said fibers between said strips to thereby embed said fibers in said medium.

11. Apparatus pursuant to claim 2 wherein said stripping means comprises:
    a pair of cutting blades having a controlled distance between each other; and
    means for accurately centering said fibers in said stripping means.

12. Apparatus pursuant to claim 2 wherein said advancing means comprises:
a pair of motor-driven rotating rollers for gripping and causing said outer segments to advance.

13. Apparatus pursuant to claim 7 wherein said direction means further comprises:
spring-loaded means for preventing transverse displacements of said aligned fibers as said fibers pass through said fiber-aligning guide.

14. Apparatus pursuant to claim 7 wherein said fiber-aligning guide aligns said plurality of optical fibers into a contiguous coplanar array, said fiber-aligning guide comprising:

a surface plate comprising a first planar reference surface with at least one vacuum slot to vacuum attract said fibers to said first reference surface;

a block engaged to said surface plate to define a second reference surface parallel to the desired longitudinal axes of said fibers, whereby said vacuum slot extends substantially from said second reference surface and extends sufficiently to vacuum-attract all said fibers to said first reference surface;

a spring-loaded cover for applying a controlled force to said fibers against said first reference surface; and a spring for applying a predetermined force on the furthermost fiber from said second reference surface to urge all said fibers toward said second reference surface.

* * * * *

UNITED STATES PATENT AND TRADEMARK OFFICE
CERTIFICATE OF CORRECTION

PATENT NO. : 4,096,010

DATED : June 20, 1978

INVENTOR(S) : William L. Parham and Morton J. Saunders

It is certified that error appears in the above-identified patent and that said Letters Patent are hereby corrected as shown below:

Column 5, line 51, "travels" should read --travel--, "channel" should read --channels--. Column 6, line 26, "conttiguous" should read --contiguous--. Column 6, line 65, "predetermmined" should read --predetermined--. Column 7, line 59, "somme" should read --some--. Column 8, line 39, "tensil" should read --tensile--. Column 9, line 29, "cutter" should read --outer--. Column 10, line 53, "2" should read --7--. Column 10, line 63, "2" should read --7--. Column 11, line 1, "2" should read --7--.

Signed and Sealed this

Sixth Day of March 1979

[SEAL]

Attest:

RUTH C. MASON
*Attesting Officer*

DONALD W. BANNER
*Commissioner of Patents and Trademarks*